United States Patent
Wood

(10) Patent No.: US 8,146,286 B2
(45) Date of Patent: Apr. 3, 2012

(54) METHOD AND HANDHELD DEVICE FOR TYING A FISHING KNOT

(76) Inventor: Franklin D. Wood, Slocumb, AL (US)

( * ) Notice: Subject to any disclaimer, the term of this patent is extended or adjusted under 35 U.S.C. 154(b) by 491 days.

(21) Appl. No.: 12/413,692

(22) Filed: Mar. 30, 2009

(65) Prior Publication Data

US 2009/0300966 A1 Dec. 10, 2009

Related U.S. Application Data

(63) Continuation-in-part of application No. 11/940,584, filed on Nov. 15, 2007.

(60) Provisional application No. 61/134,940, filed on Jul. 15, 2008.

(51) Int. Cl.
*A01K 97/00* (2006.01)
(52) U.S. Cl. .................................. 43/4; 289/17
(58) Field of Classification Search ..................... 43/4, 1; 289/17
See application file for complete search history.

(56) References Cited

U.S. PATENT DOCUMENTS

| | | | | |
|---|---|---|---|---|
| 4,202,093 A * | 5/1980 | Wallerstein | ..................... | 30/169 |
| 5,036,609 A * | 8/1991 | McDaniel et al. | ........... | 38/102.2 |
| 5,197,217 A * | 3/1993 | Browning | ........................... | 43/4 |
| 5,593,189 A * | 1/1997 | Little | ............................... | 289/17 |
| 5,647,616 A * | 7/1997 | Hamilton | ....................... | 289/17 |
| 5,791,699 A * | 8/1998 | High | ............................... | 289/17 |
| 5,829,798 A * | 11/1998 | Little | ............................... | 289/17 |
| 2004/0004355 A1* | 1/2004 | Beers | ............................... | 289/17 |
| 2006/0028022 A1* | 2/2006 | James | ............................... | 289/17 |
| 2007/0182157 A1* | 8/2007 | Carrier | ............................ | 289/17 |

* cited by examiner

*Primary Examiner* — Christopher P Ellis

(57) ABSTRACT

A handheld device is provided for aiding in attaching a fishing line to a fishing hook having an eye. The device includes a holder having a first end and a second end. At least one of the first end and the second end includes an opening through which the hook can be securely coupled. An end of the fishing line is inserted through the eye of the fishing hook to tie a fishing knot. The device can also include a fishing lure extending from at least one of the first end and the second end. The opening can be one of a slit, a groove, a slot, a hole, and a notch.

18 Claims, 4 Drawing Sheets

METHOD AND HANDHELD DEVICE FOR TYING A FISHING KNOT

RELATED APPLICATIONS

This application is a Continuation-in-part of the co-pending application Ser. No. 11/940,584, filed Nov. 15, 2007, and titled "METHOD AND HANDHELD DEVICE FOR TYING A FISHING KNOT".

This Application also claims priority under 35 U.S.C. §119 (e) of the co-pending U.S. Provisional Application Ser. No. 61/134,940, titled "METHOD AND HANDHELD DEVICE FOR TYING A FISHING KNOT," filed Jul. 15, 2008. The co-pending application Ser. No. 11/940,584, filed Nov. 15, 2007, and titled "METHOD AND HANDHELD DEVICE FOR TYING A FISHING KNOT" and the co-pending U.S. Provisional Application Ser. No. 61/134,940, titled "METHOD AND HANDHELD DEVICE FOR TYING A FISHING KNOT," filed Jul. 15, 2008, are all hereby incorporated by reference.

FIELD OF THE INVENTION

This invention relates to a device and method of tying a fishing knot. More specifically, this invention relates to a stabilizer or handheld device for aiding in attaching a fishing line to a fishing hook having an eye.

BACKGROUND OF THE INVENTION

Fishing is an ancient and worldwide practice with various techniques and traditions. The practice of catching or attempting to catch fish with a hook is known as angling. The hook is usually attached by a line to a fishing rod and can be dressed with lures or bait.

Several steps are necessary to manually tie a hook onto a fishing line. The end of the fishing line is inserted through the eye of the hook. Next, the end of the line is wrapped around a line going back to the reel ("reel line") several times, forming twists. The end of the line is passed through a loop that exists between the eye of the hook and the twists. The end of the line is passed through a second loop that was created in the previous step. Then, a knot is formed by pulling the end of the line; the knot is slid down to the eye, and tightened by pulling the reel line. The end of the line is trimmed, resulting in a knot (or uni-knot).

Given the above description of manually tying a knot, it will be widely appreciated that tying a knot is a challenging undertaking, particularly for senior citizens having reduced visual acuity and dexterity, or for those having sustained significant hand injuries. In addition, fishermen fishing in the dark, in poor light conditions, or in cold weather, will have more difficulty hooking a line, with its many twists and loops.

It would therefore be advantageous if there were a handheld device for aiding in attaching a fishing line to a fishing hook.

SUMMARY OF THE INVENTION

The present invention is directed to a method of and device for improving ease of threading a fishing line on an eye of a fishing hook. In one embodiment of the present invention, a handheld device for aiding in attaching a fishing line to a fishing hook having an eye is disclosed. The device comprises a holder having a first end and a second end. At least one of the first end and the second end includes an opening through which the hook can be securely coupled. An end of the fishing line is inserted through the eye of the hook to tie a fishing knot.

Once the end of the fishing line is inserted through the eye of the hook, a fishing knot is tied by simply rolling the handheld device along a portion of the body, such as the upper leg, while, for example, holding the device with one hand and the fishing line with the other. As an example of this, after securing the fishing hook in the opening and inserting the end of the fishing line through the eye of the hook, the fishing line can be held in the left hand while holding the device in the right hand. The device is twisted to form several loops. The end of the fishing line is inserted back through the loop. Then, the fishing line (the line going back to the fishing reel) and the end of the fishing line are pulled down to the eye to form a knot. Any excess material can be trimmed off.

The device can further include a fishing lure which extends from at least one of the first end and the second end. The lure can include a slot for allowing access of an eye of the lure.

In accordance with an embodiment of the present invention, a material of the holder can be one of wood, metal, plastic and various combinations thereof. The holder can be a rod, a stick, a spindle, a tube, or any device that acts as a stabilizer for improving ease of threading a fishing line through an eye of a fishing hook. The opening in at least one of the first end and the second end can be a slit, a groove, a slot, a hole, or a notch.

In one embodiment of the present invention, the eye of the hook is coated with a fluorescent material. In another embodiment of the present invention, the eye of the hook is elongated for ease of inserting the end of the line through the eye.

In accordance with another embodiment of the present invention, a method of attaching a fishing line to a fishing hook having an eye is disclosed. The method comprises providing a holder having a first end and a second end, wherein at least one of the first end and the second end includes an opening through which the hook can be securely coupled. The method also comprises inserting an end of the line through the eye of the hook to tie a fishing knot. The method can further comprise extending a fishing lure from at least one of the first end and the second end. The method can also comprise coating the eye of the hook with a fluorescent material. The method can also comprise elongating the eye of the hook for ease of inserting the end of the line through the eye.

In accordance with another embodiment of the present invention, a handheld device for aiding in attaching a fishing line to a fishing hook having an eye is disclosed. The device includes a holder having a first end and a second end, at least one of the first end and the second end including an opening through which the hook can be securely coupled, wherein an end of the fishing line is inserted through the eye of the fishing hook to tie a fishing knot; and a nut embedded on to one of the first end and the second end of the holder for fixing a position of the opening. The nut is one of an embedded nut and a wing nut, but is not limited to either nut. The device can further include a light source for emitting light. The device can also include a cutter for cutting the fishing line.

In accordance with another embodiment of the present invention, a handheld device for aiding in attaching a fishing line to a fishing hook having an eye is disclosed. The device includes a holder having a first end and a second end, at least one of the first end and the second end including an opening through which the hook can be securely coupled, wherein an end of the fishing line is inserted through the eye of the fishing hook to tie a fishing knot; and a button screw screwed to one of the first end and the second end of the holder for fastening a first side of the opening and a second side of the opening together.

In accordance with another embodiment of the invention, a handheld device for aiding in attaching a fishing line to a fishing hook having an eye, comprising: a holder having a first end and a second end, at least one of the first end and the second end including an opening through which the hook can be securely coupled; a nut embedded on to one of the first end and the second end of the holder for fixing a position of the opening; and a cutter for cutting the fishing line. The device can further include a light source. The light source is an LED light source, but not limited to an LED light source. The light source is coupled to a battery source via wires.

DETAILED DESCRIPTION OF THE PREFERRED EMBODIMENTS

Figure 1A:
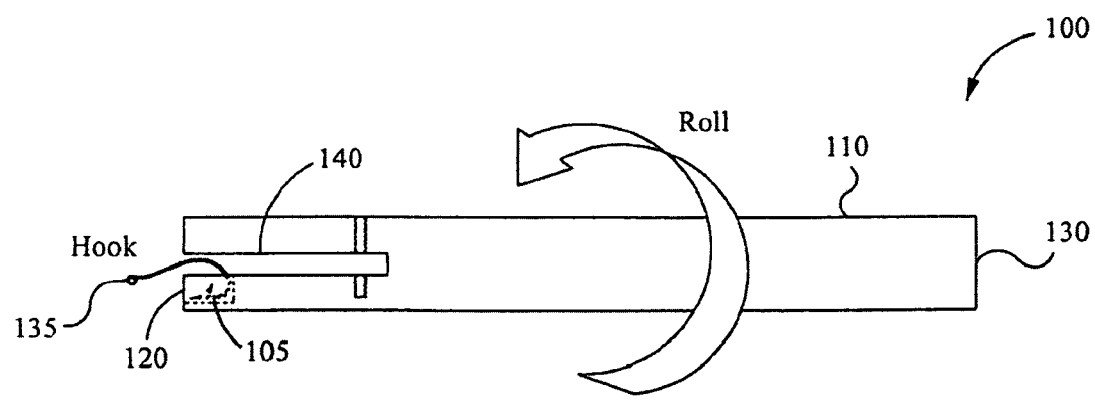
FIG. 1A shows a handheld device for aiding in attaching a fishing line to a fishing hook, in accordance with one embodiment of the present invention.

The present invention is directed to a method and handheld device (or stabilizer) for aiding in attaching a fishing line to a fishing hook having an eye. FIG. 1A shows a handheld device 100 for aiding in attaching a fishing line to a fishing hook, in accordance with one embodiment of the present invention. The handheld device 100 includes a holder 110 having a first end 120 and a second end 130. In one embodiment, one of the first end 120 and the second end 130 includes an opening 140 through which a fishing hook 105 is securely coupled. In the FIG. 1A, the first end 120 includes the opening 140. An end of a fishing line (not shown) is inserted through an eye 135 of the fishing hook 105 to tie a fishing knot (now shown).

Once the end of the fishing line is inserted through the eye of the hook, a fishing knot is tied by simply rolling the handheld device along a portion of the body, such as the upper leg, while, for example, holding the device with one hand and the fishing line with the other. As an example of this, after securing the fishing hook in the opening and inserting the end of the fishing line through the eye of the hook, the fishing line can be held in the left hand while holding the device in the right hand. The device is twisted to form several loops. The end of the fishing line is inserted back through the loop. Then, the fishing line (the line going back to the fishing reel) and the end of the fishing line are pulled down to the eye to form a knot. Any excess material can be trimmed off.

In accordance with the present invention, the holder 110 can be made of wood, metal, plastic or various combinations thereof. The holder 110 can be one of a rod, a stick, a spindle, and a tube. The holder 110 can be any device for aiding in attaching a fishing line to a fishing hook. The opening 140 can be one of a slit, a slot, a stick, a spindle, a tube, or any space through which a fishing hook can be securely coupled.

In accordance with the present invention, the eye 135 of the hook 105 can be coated with a fluorescent material, so that users having reduced visual acuity and dexterity can more easily insert the end of the line through the eye 135. Similarly, the eye 135 of the hook 105 can be elongated for ease of inserting the end of the line through the eye 135.

Figure 1B:
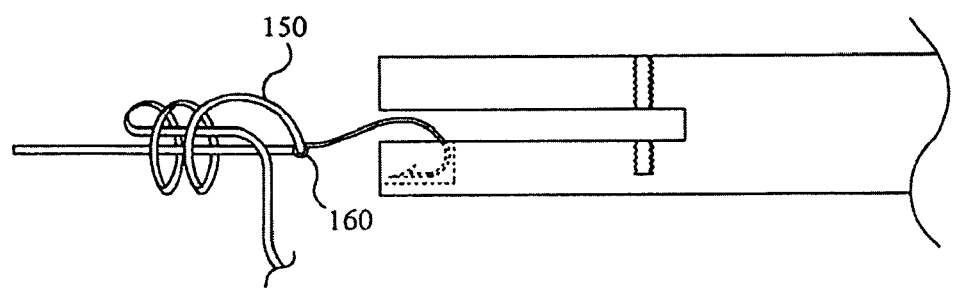
FIG. 1B shows a handheld device for aiding in attaching a fishing line to a fishing hook, including an end of a fishing line inserted through the eye of the hook, in accordance with one embodiment of the present invention.

FIG. 1B shows a handheld device for aiding in attaching a fishing line to a fishing hook, including an end of a fishing line inserted through the eye of the hook, in accordance with one embodiment of the present invention. In the FIG. 1B, a fishing line 150 is shown being inserted through an eye 160 (of a fishing hook) and then tied, as described above.

Figure 2A:
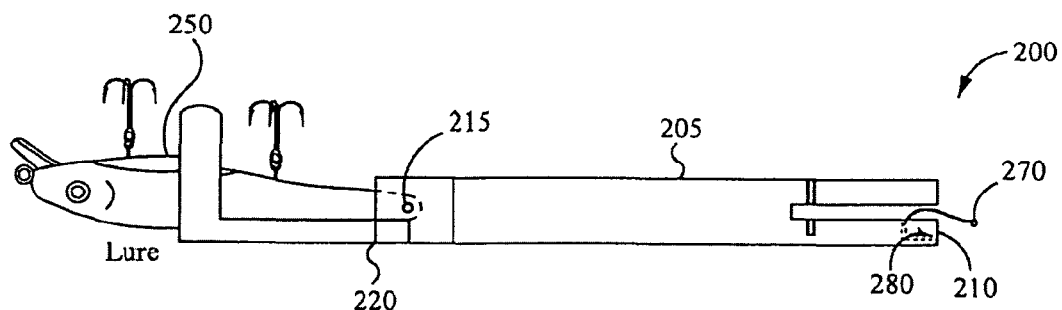
FIG. 2A shows a handheld device for aiding in attaching a fishing line to a fishing hook, including a fishing lure extending from one end of the device, in accordance with one embodiment of the present invention.
Figure 2B:
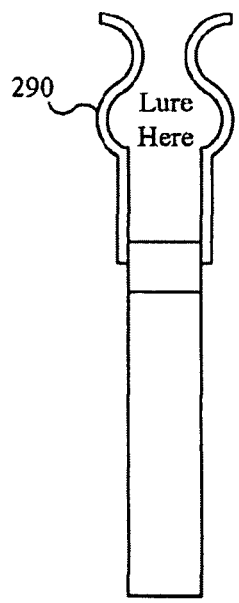
FIG. 2B shows an alternative view of the handheld device of FIG. 2A for coupling a lure on one end of the device, in accordance with one embodiment of the present invention.
Figure 2C:
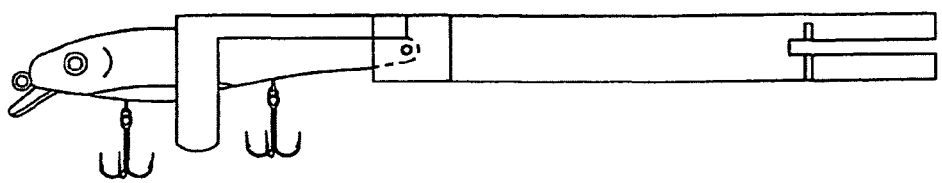
FIG. 2C shows an alternative view of the handheld device of FIG. 2A, including a fishing lure extending from one end of the device, in accordance with one embodiment of the present invention.

FIG. 2A shows a handheld device 200 for aiding in attaching a fishing line (not shown) to a fishing hook 280 having an eye 270, wherein the device 200 includes a fishing lure 250 extending from one of a first end 210 and a second end 220 of the device 200, in accordance with one embodiment of the present invention. In the FIG. 2A, the lure 250, which extends from the second end 220, is can be held in place by an adjustable screw connection 215. As shown in FIG. 2B, the lure 250 can be stabilized via a spring or clip 290. The clip 290 can be made of steel, plastic or any device for stabilizing the fishing lure to the handheld device 200. The clip can also include a slot for allowing access of any eye of the lure. FIG. 2C shows an alternative view of the handheld device of FIG. 2A, including a fishing lure extending from one end of the device, in accordance with one embodiment of the present invention.

Figure 3:
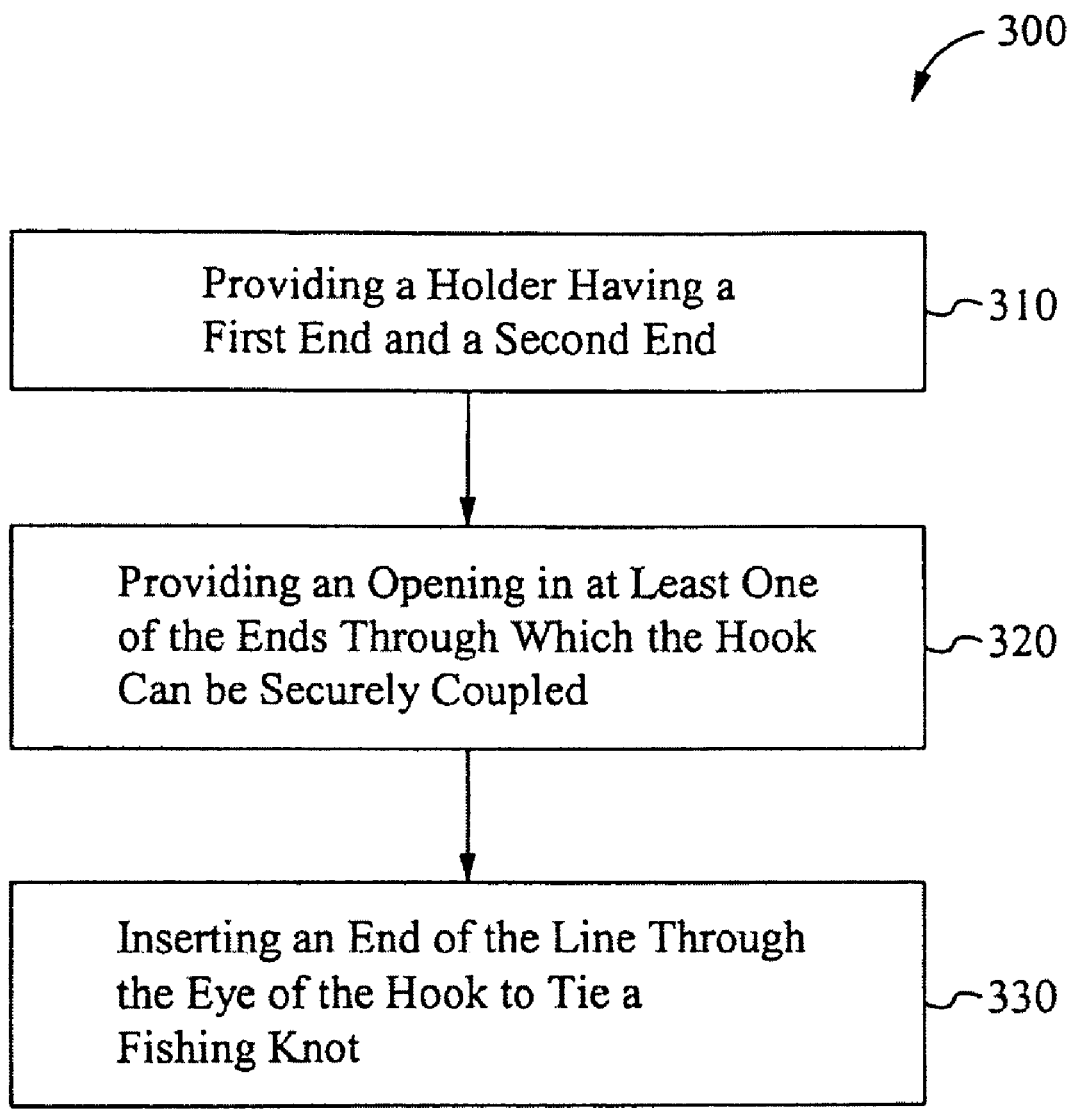
FIG. 3 shows a flow chart of a method of attaching a fishing line to a fishing hook having an eye, in accordance with one embodiment of the present invention.

FIG. 3 shows a flow chart of a method 300 of attaching a fishing line to a fishing hook having an eye, in accordance with one embodiment of the present invention. In the Step 310, a holder is provided having a first end and a second end. In the Step 320, an opening is provided in at least one of the ends through which the hook can be securely coupled. In the Step 330, an end of the fishing line is inserted through the eye of the hook to tie a fishing knot.

In accordance with one embodiment of the present invention, the method 300 can further comprise extending a fishing lure from at least one of the first end and the second end. The method 300 can also comprise coating the eye of the hook with a fluorescent material. The method 300 can also comprise elongating the eye of the hook for ease of inserting the end of the line through the eye.

Figure 4A:
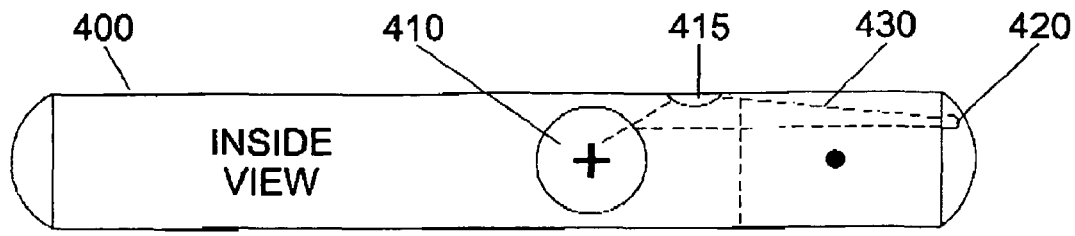
FIG. 4A shows an inside view of an alternative embodiment of a handheld device for aiding in attaching a fishing line to a fishing hook that also emits light.

FIG. 4A shows an inside view of an alternative embodiment of a handheld device 400 for aiding in attaching a fishing line to a fishing hook, wherein the handheld device 400 includes an opening or slot through which the fishing hook can be inserted, as show in FIG. 1A, for example. In this embodiment, the handheld device 400 emits light. As shown in the FIG. 4A, the handheld device 400 includes a battery source 410, a switch 415, a light source 420, and wires 430 coupling the battery source 410 to the light source 420. The battery source 410 is selected, according to the present invention, to have a voltage amount (e.g., 2-3 volts) to activate the light source 420. Battery types operative herein alone or in series to increase the output voltage include alkaline dry cells, metal hydride, and lithium batteries. In one embodiment, a button-type battery is provided to save space within the handheld device 400. The switch 415, which can comprise an on/off button, is provided for selectively forming an electrical engagement between the battery source 410 and the light source 420. The light source 420 can comprise at least one of a light emitting diode (LED), an incandescent bulb, and a phosphorescent emitter element. Preferably, the light source 420 is a LED, but is not limited to any particular light source. In one embodiment, the handheld device 400 can also include fiber optics in optical communication with the light source 420.

Figure 4B:
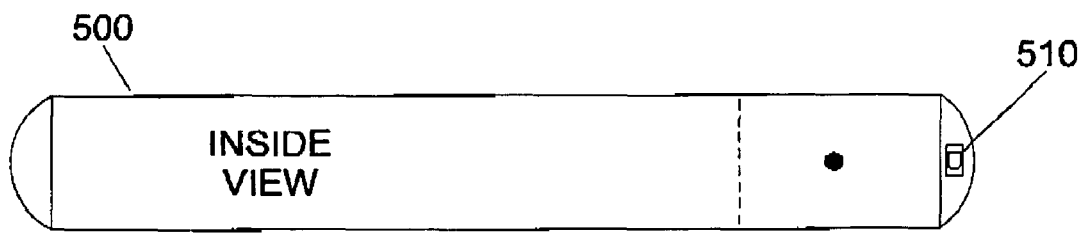
FIG. 4B shows an inside view of an alternative embodiment of a handheld device for aiding in attaching a fishing line to a fishing hook that also includes a cutter for cutting an end of the fishing line.

FIG. 4B shows an inside view of an alternative embodiment of a handheld device 500 for aiding in attaching a fishing line to a fishing hook, wherein the handheld device 500 includes an opening or slot through which the fishing hook can be inserted, as show in FIG. 1A, for example. In this embodiment, the handheld device 500 also includes a cutter 510 for cutting a fishing line, preferably an end of the fishing line. It will be appreciated that the handheld device 510 can also include a light source, as described above in connection with FIG. 4A, and the cutter 510. In the FIG. 4B, the cutter 510 is preferably a dental floss-type cutter, although the cutter 510 is not limited to any particular type of cutter. The cutter 510 can be permanently attached or detachably coupled to the handheld device 500 and located anywhere on the handheld device 500. The cutter 510 can also include a replaceable blade.

Figure 4C:
FIG. 4C shows an outside view of an alternative embodiment of a handheld device for aiding in attaching a fishing line to a fishing hook that also includes an embedded nut to fix a position of a slot of the device.

FIG. 4C shows an outside view of an alternative embodiment of a handheld device 600 for aiding in attaching a fishing line to a fishing hook, wherein the handheld device 600 includes an opening or slot through which the fishing hook can be inserted, as show in FIG. 1A, for example. In this embodiment, the handheld device 600 includes an embedded nut 610 or wing screw that is embedded on to one side of the handheld device 600 to adjust a position of the opening or slot. In the FIG. 4C, a screw is screwed into the embedded nut 610 and extends through the slot 140 (FIG. 1A) of the handheld device 600 and is adjustable by tightening and/or loosening the nut 610.

Figure 4D:
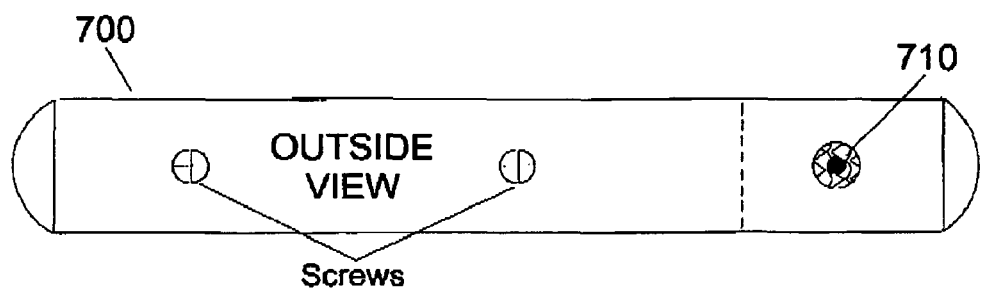
FIG. 4D shows an outside view of an alternative embodiment of a handheld device for aiding in attaching a fishing line to a fishing hook that also includes a button screw for fastening a first end of a slot of the device to a second end of the slot.

FIG. 4D shows an outside view of an alternative embodiment of a handheld device 700 for aiding in attaching a fishing line to a fishing hook, wherein the handheld device 700 includes an opening or slot through which the fishing hook can be inserted, as show in FIG. 1A, for example. In this embodiment, a button screw 710 is shown that is screwed into an embedded nut. In the FIG. 4D, the button screw 710, which is screwed onto a first side of the handheld device 700, is utilized to adjust the opening. Also, exposed screws are shown for opening and replacing an optional battery of the device 700, as shown in the FIG. 4A.

Figure 5:
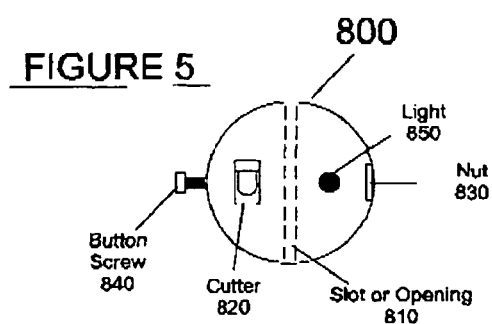
FIG. 5 shows a cross-sectional view of an alternative embodiment of a handheld device for aiding in attaching a fishing line to a fishing hook.

FIG. 5 shows a cross-sectional view of an alternative embodiment of a handheld device 800 for aiding in attaching a fishing line to a fishing hook, wherein the handheld device 800 includes an opening or slot through which the fishing hook can be inserted, as show in FIG. 1A, for example. In the FIG. 5, the handheld device 800 includes an opening or slot 810 through which the hook can be securely coupled; a cutter 820 for cutting an end of a fishing line, a nut 830 and/or button screw 840—or any fastening means—for adjusting or fixing a position of the slot 810; and a light source 850.

The present invention has been described in terms of specific embodiments incorporating details to facilitate the understanding of principles of construction and operation of the invention. Such reference herein to specific embodiments and details thereof is not intended to limit the scope of the claims appended hereto. It will be apparent to those skilled in the art that modification may be made in the embodiments chosen for illustration without departing from the spirit and scope of the invention.

What is claimed is:

1. A handheld device for aiding in attaching a fishing line to a fishing hook having an eye, comprising:
  a. a holder having a first end and a second end, at least one of the first end and the second end including an opening through which the hook can be securely coupled, wherein an end of the fishing line is inserted through the eye of the fishing hook to tie a fishing knot, the other of said first end and second end having a clip attached thereto; and
  b. a wing screw coupled with a nut for adjusting a position of the opening.

2. The device of claim 1 wherein said clip is for holding a fishing lure to be tied.

3. The device of claim 1 wherein a material of the holder is one of wood, metal, plastic, and various combinations thereof.

4. The device of claim 1 wherein the holder is one of a rod, a stick, a spindle, and a tube.

5. The device of claim 1 wherein the opening is one of a slit, a groove, a slot, a hole and a notch.

6. The device of claim 1 wherein the eye of the hook is coated with a fluorescent material.

7. The device of claim 1 wherein the eye of the hook is elongated for ease of inserting the end of the line through the eye.

8. The device of claim 1 wherein the nut is an embedded nut.

9. The device of claim 1 further comprising a light source for emitting light.

10. The device of claim 1 further comprising a cutter for cutting the fishing line.

11. A handheld device for aiding in attaching a fishing line to a fishing hook having an eye, comprising:
  a. a holder having a first end and a second end, at least one of the first end and the second end including an opening through which the hook can be securely coupled, wherein an end of the fishing line is inserted through the eye of the fishing hook to tie a fishing knot, the other of said first end and second end having a clip attached thereto for holding a fishing lure; and
  b. a screw screwed to one of the first end and the second end of the holder for adjusting the opening.

12. The device of claim 11 further comprising a light source for emitting light.

13. The device of claim 11 further comprising a cutter for cutting the fishing line.

14. The device of claim 11 wherein the button screw is screwed into an embedded nut.

15. A handheld device for aiding in attaching a fishing line to a fishing hook having an eye, comprising:
   a. a holder having a first end and a second end, at least one of the first end and the second end including an opening through which the hook can be securely coupled;
   b. a screw screwed to one of the first end and the second end of the holder for adjusting a position of the opening, the other of said first end and second end having a clip attached thereto for for holding a fishing lure; and
   c. a cutter for cutting the fishing line.

16. The device of claim 15 further comprising a light source.

17. The device of claim 16 wherein the light source is an LED light source.

18. The device of claim 16 wherein the light source is coupled to a battery source via wires.

* * * * *